United States Patent

[11] 3,607,392

[72] Inventors: Karl Lauer, Schriescheim Strahlenburg; Peter Stephan, Worms; Georg Stoeck, Mannheim-Waldhof, all of Germany
[21] Appl. No. 781,411
[22] Filed Dec. 5, 1968
[45] Patented Sept. 21, 1971
[73] Assignee Boehringer Mannheim GmbH, Mannheim, Germany
[32] Priority Dec. 21, 1967
[33] Germany
[31] P 16 43 720.0

[54] PROCESS AND APPARATUS FOR THE RECOVERY OF CRYSTALLINE FRUCTOSE FROM METHANOLIC SOLUTION
13 Claims, 1 Drawing Fig.

[52] U.S. Cl. .................................................. 127/15, 23/273, 62/58, 127/30, 127/58
[51] Int. Cl. ................................................... C13k 9/00, C13k 1/10, C13f 1/02
[50] Field of Search ......................................... 127/15, 16, 20–22, 29, 30, 58, 60–62; 23/273, 273 C; 62/58

[56] References Cited
UNITED STATES PATENTS

| | | | |
|---|---|---|---|
| 2,034,615 | 3/1936 | Gensecke | 23/273 X |
| 2,091,900 | 8/1937 | Widmer | 127/16 X |
| 2,357,838 | 9/1944 | Mahoney | 127/58 |
| 2,669,530 | 2/1954 | Kite | 127/60 |
| 2,791,333 | 5/1957 | McKay | 62/58 X |
| 2,813,851 | 11/1957 | McKay | 23/273 FX |
| 3,321,282 | 5/1967 | Schneider et al. | 62/58 X |

FOREIGN PATENTS

| 1,163,307 | 2/1964 | Germany | 127/30 |
|---|---|---|---|

OTHER REFERENCES
Perry, "Chemical Engineer's Handbook," 4th Ed., McGraw-Hill, 22-94-22-107 (1964)

Primary Examiner—Morris O. Wolk
Assistant Examiner—D. G. Conlin
Attorney—Burgess, Dinklage and Sprung ABSTRACT: An apparatus and method for recovering crystalline fructose from methanolic solutions thereof comprising dissolving molten fructose having a temperature of 60° 75° C. and a water content of less than 3 percent in substantially the same volume of preheated methanol to produce a solution having a concentration of 55–70 percent fructose and a temperature of 40°–50° C., continuously introducing the thusly formed solution into the top end of a system which includes a double-walled vertically arranged seed crystal containing cylindrical vessel, s stirrer shaft therein disposed inside this seed crystal-containing vessel, a plurality of horizontal dividers provided with central openings arranged in said system so as to divide the same into zones to be maintained at different temperatures, continuously withdrawing from the bottom end of said system an amount of crystalline fructose dispersed in methanol substantially equivalent to the amount of solution being charged into said system and thereafter separating the crystalline fructose from the methanol.

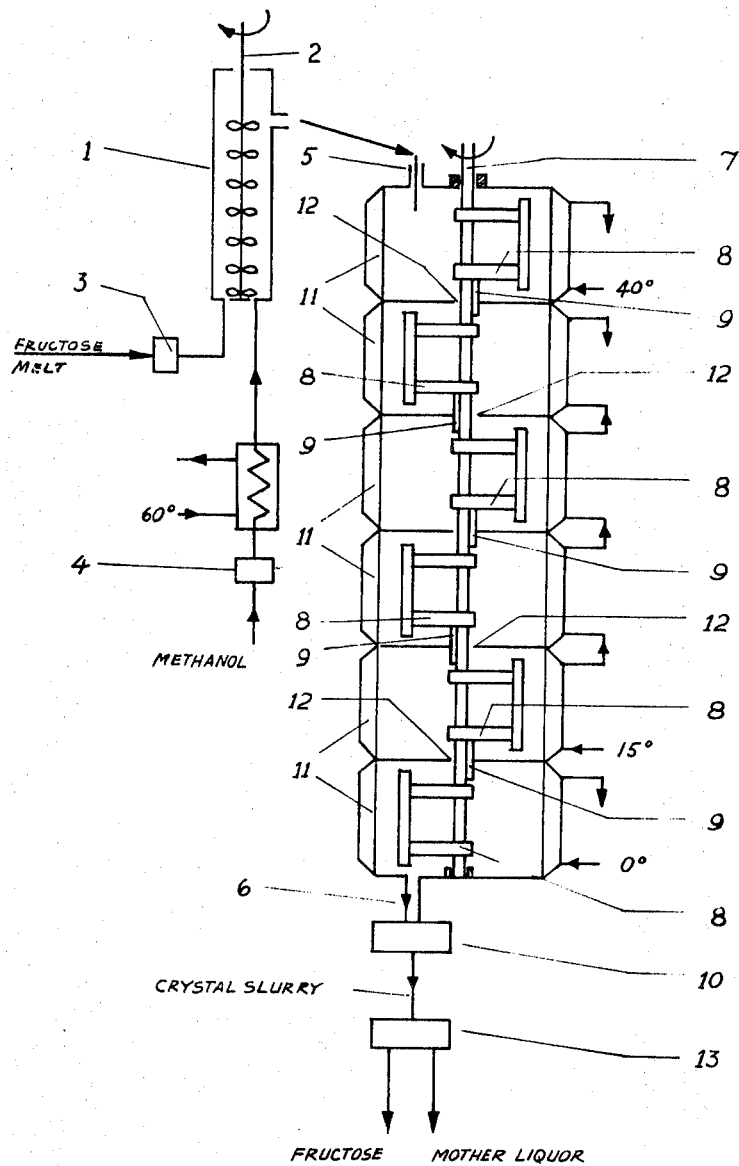

PROCESS AND APPARATUS FOR THE RECOVERY OF CRYSTALLINE FRUCTOSE FROM METHANOLIC SOLUTION

This invention relates to a process for the recovery of crystalline fructose from methanolic solutions thereof. More particularly this invention relates to a process allowing for the continuous recovery of highly purified, crystalline fructose and to apparatus for use in connection therewith.

It is known to recrystallize fructose from methanol for the purpose of purifying the same (Ullmanns Encyklopaedie der techn. Chemie, Volume 9, pages 660–663). For this purpose, a fructose syrup having a dry matter content of 90–95 percent is dissolved in hot methanol and, with the addition of seed crystals, allowed to cool slowly. Following crystallization times amounting to on the average to 30 hours, the crystals obtained are separated from the mother liquor by centrifugation, washed with cold methanol and dried under vacuum. The yields of first crystallizate which can the be centrifuged off amount to a maximum of 65 percent of theory. A further 5 percent of theory can be obtained as sieve undersize. A less pure second crystallizate is obtained from the mother liquor so that the total yield amounts to about 72.5 percent of theory.

It is one object of the present invention to provide an improved method for recovering crystalline fructose from methanolic solutions containing the same.

Another object of the present invention is to provide an improved method for recovering highly pure crystalline fructose in good yields from methanolic solutions thereof.

Still another object of the invention is to provide an apparatus facilitating the recovery of crystalline fructose from methanolic solutions thereof. These and still further objects will become apparent from the following description read in conjunction with the drawing in which:

The FIGURE is a diagrammatic vertical cross section of an embodiment of an apparatus in accordance with the invention. It has now been found in accordance with the invention that crystalline fructose may be recovered from methanolic solutions thereof, in a particularly favorably manner, i.e., that the yields and the degree of purity of the fructose can be substantially increased and, at the same time, the operating costs and the space requirements can be substantially decreased by dissolving molten fructose having a temperature of 60°–75°C and a water content of less than 3 percent and preferably of less than 2 per cent with intensive stirring in about the same volume of preheated methanol to produce a solution having a concentration of 55–70 percent, preferably 60–65 per cent fructose and a temperature of about 40°–50°C, introducing the thusly formed solution from above into a system including a jacketed, vertically arranged, closed seed crystal containing cylindrical crystallization vessel, said vessel having a stirrer shaft therein disposed passing down therethrough, a plurality of intermediate dividers provided with central bores dividing up the vessel and its jacket into chambers or zones to be maintained at different temperatures, continuously withdrawing from the bottom end of said system a quantity of crystalline fructose slurry which substantially corresponds to the amounts of fructose and methanol introduced into the top end thereof, and separating the slurry into crystalline fructose and methanolic mother liquor.

This final separation of the crystal slurry into fructose and methanolic mother liquor is carried out in the conventional manner and preferably with the use of a continuously operating thrust centrifuge which, if desired, allows for a simultaneous afterwashing of the crystalline product with cold methanol.

According to the present invention, there is obtained a highly purified fructose of very uniform crystal size in yields of over 80 percent. The yield of the first crystalline recovered by the method of the invention increases from 65 to 83 percent of theory. In general, the crystals thusly obtained are in such a uniform and clean form that it is possible to completely omit the afterwashing with methanol. Surprisingly, the proportion of undesired, generally very fine-grained sieve undersize decreases from 5 to 4 percent of theory. The sieve analysis of the crystalline fructose produced according to the present invention establishes that in comparison with crystallizates produced by the previously available methods, the deviations in the crystal sizes from the average particle size fall within a narrower Gauss distribution curve than previously realized. What makes this result all the more surprising is the fact that the average residence time of the fructose in the crystallization vessel is, according to the process of the present invention, less than half that of the crystallization time needed in the previously known processes.

Further important advantages of the process according to the present invention are that, due to the continuous method of operation, the expenditure of labor can be considerably reduced and the process as a whole can even be adapted to automatic operation.

Finally, the new process according to the present invention permits a substantially better utilization of space as a crystallization container having about 550 liters holding capacity enables 15 metric tons of fructose to be produced per month, whereas according to the known procedures, for the production of the same amount of fructose, it would be necessary to use a crystallization container having a holding capacity of 1650 liters.

The apparatus in accordance with the present invention for carrying out the fructose recovery in a particularly favorable manner comprises:

a. a vertical mixing cylinder provided with a rapidly rotating vane stirrer, two material supply pipes, connected with dosing pumps at the bottom end thereof and a discharge pipe at the upper end thereof;

b. a double-walled, i.e., jacketed vertically arranged, closed, cylindrical crystallization vessel having a discharge outlet at its lower end and an inlet at its upper end, this upper inlet being connnected with the discharge pipe of the mixing cylinder, the crystallization vessel being provided with a stirrer shaft passing downwardly therethrough and a plurality of horizontal dividers having central bores therein dividing the crystallization vessel and the jacket thereof into chambers, the temperatures of which can be varied, with annular gaps between the central bores in the dividers and the stirrer shaft;

c. a dosing pump connected to the lower discharge outlet from the crystallization vessel, the dosing pump being so adjusted that the dosage provided is correlated with that provided by the dosing pumps provided in the mixing cylinder; to the dosing pumps at the bottom of the crystallization vessel, there is preferably connected a thrust centrifuge which allows for a simultaneous afterwashing with solvent should the same be desired.

There are provided on the stirrer shaft passing through the crystallization vessel stirrer arms which are preferably constructed in the form of closed stirrups. The stirrer arms thereby act simultaneously as scrapers and prevent the deposition of crystalline fructose on the inner surfaces of the wall of the crystallization vessel. The operation of the stirrer shaft is preferably such that it can be regulated to rotate at a speed of from 60–180 r.p.m. This speed of stirring ensures a sufficient mixing up of the material in the crystallization container but does not give use to any undesirable turbulence or longitudinal mixing.

It has also been found to be advantageous to provide scraper cams on the stirrer shaft at the level of the annular gaps which act to ensure that these annular gaps do not become blocked with crystals.

Due to the fact that not only the interior of the crystallization vessel but also the jacket thereof is divided up into several chambers, the temperatures of which can be varied, it is possible to provide an optimum temperature gradient in the apparatus according to the present invention. Thus, it has proved to be particularly advantageous to warm the uppermost section of the jacket to 40°C. and to cool the lowermost section of the jacket to 0°C. and to pass cooling water with a temperature of about 15°C. through the other sections in counter current. The temperatures at which the heating and cooling water are to be maintained are not absolutely critical but, nevertheless, care must be taken that the solution is not cooled too much in the upper chamber of the crystallization vessel in order to avoid too great a supersaturation. A viewing glass installed in the upper end of this vessel permits a ready observation of the seed bed.

Through the annular gaps, which, in general, should not amount to more than 1 percent and preferably 0.5 percent, of the surface cross section of a chamber of the vessel, the crystalline slurry gradually passes downwardly from the uppermost chamber of the vessel into and through those arranged thereafter, is finally intensively cooled in the last chamber and then removed by the dosing pump. Rotary slide valve piston dosing pumps have proved to be particularly useful for carrying off the crystalline slurry. A regulation and mutual adjustment of the dosing pumps located at the entry end and discharge end of the apparatus according to the present invention takes place, in the simplest case, by manual adjustment. A small aerating or ventilating tube arranged at the upper end of the crystallization vessel or on the mixing cylinder allows for an equilibration of any possible variations in pressure. Of course, it is also possible to regulate one or more of the dosing pumps automatically by means of the level of filling or through the internal pressure.

For carrying out the process according to the present invention, it is necessary to introduce sufficient seed crystals into the crystallization vessel. It has proved to be entirely sufficient to introduce into the uppermost section only once, a certain amount of seed crystals and then to circulate the same therein for such a period of time that a readily crystallizing, stable seed bed forms in the uppermost chamber. Not only when starting up the apparatus but also during the continuous operation thereof, it is necessary to maintain the operating conditions as accurately as possible. Thus, the fructose melt, which is advantageously obtained from a 70 percent thick syrup by direct evaporation in a vacuum thin layer evaporator to the desired water content of less than 3 percent, should, if possible, have a temperature of 60°–75° C. Colder solutions are too viscous and, therefore, can only be mixed with methanol with difficulty, while hotter solutions tend to decompose and to form methyl fructosides which have an inhibiting action on crystallization. On the other hand, the water content of the melt should be as low as possible, preferably even less than 2 percent, as water considerably increases the solubility of fructose in the mother liquor. The ratio of fructose to methanol should be kept as accurately as possible at from 55 to 70 preferably between 60 and 65 percent by weight as such solutions still allow sufficiently high rates of crystallization to be achieved without leaving unnecessarily high amounts of fructose in the mother liquor. The methanol used for dissolving the fructose should be prewarmed in a thermostatically controlled heating bath to such an extent that the resultant solution is obtained with a temperature of 40°–50° C. and can thus be introduced directly into the uppermost section of the crystallization vessel.

Furthermore, it has proved to be advantageous to so regulate the average residence time of the hot fructose/methanol mixture in the dissolving vessel by means of the dosing pumps that, on the one hand, complete solution is obtained, but on the other hand, the fresh solution formed is removed as quickly as possible from the dissolving vessel and transferred to the crystallization vessel. An average residence time of 5 minutes has proved to be satisfactory and sufficient for the method according to the present invention.

The following example is given in order to illustrate the method according to the present invention and is explained in detail by reference to the accompanying drawing, which illustrates a preferred embodiment of the apparatus according to the present invention. The scope of the invention is not to be considered as limited by the example.

In the drawing the following numerals designate the indicated structures.

1 = mixing cylinder
2 = vane stirrer
3 = dosing pump for the fructose melt
4 = dosing pump for the methanol
5 = upper inlet to the crystallization vessel
6 = lower discharge from the crystallization vessel
7 = stirrer shaft
8 = stirrer arm
9 = scraper cam
10 = dosing pump for the crystal slurry
11 = heating or cooling jacket
12 = annular gap
13 = separating device (e.g. a thrust centrifuge)

EXAMPLE

A purified fructose solution was neutralized as accurately as possible. (As fructose solution there can be employed such a solution as is obtained, for example, by the previously known fructose processes (Ullmann supra) or according to the process of copending U.S. Pat. application Ser. No. 569,326). The solution was brought to a water content of 1.7–1.9 percent in a "Luwa" vacuum thin layer evaporator and was pumped, as a viscous melt having a temperature of about 70° C. through a conduit which was thermostatically controlled at a temperature of 70° C. into the lower end of a dissolving vessel while using for the pumping a heated dosing pump. The dissolving vessel was constructed as a 45 cm. high, flanged over glass cylinder having an internal diameter of 10 cm. and a capacity of 3.5 litres. Simultaneously using a second dosing pump, anhydrous methanol was pumped at a thermostatically controlled temperature of 30° C. through a separate conduit into the dissolving vessel. The contents of the dissolving vessel were rapidly and intensively mixed by means of a rapidly rotating vane stirrer which was provided with 10 vanes. The temperature of the resultant mixture amounted to about 50° C. Through an exit pipe provided at the top of the dissolving vessel, 40 litres per hour of a clear solution which consisted of 26.6 kg. fructose and 20.0 litres methanol were discharged. The discharged solution passed into the uppermost chamber of the crystallization vessel. The average residence time of the fructose in the dissolving or mixing vessel amounted to 5.5 minutes.

The crystallization vessel included six double-walled chambers of equal size having an internal diameter and a height of 0.5 meters. The total capacity of the six chambers amounted to 550 litres. The individual chambers were separated from one another by horizontally arranged dividers. Each divider had been provided with a central bore having a diameter of 50 mm. There extended through the central bores a stirrer shaft having a diameter of 40 mm., thereby leaving an annular gap having a width of 5 mm. There were provided stirrup-shaped stirrer arms on the stirrer shaft which simultaneously acted as scrapers and thus prevented the fructose from crystallizing out on the inner surfaces of the individual chambers. The speed of rotation of the stirrer shaft was regulated to between 60 and 180 r.p.m. and, in the case of continuous operation, was operated at a speed of 110 r.p.m. At the level of the dividers there were provided, on the stirrer shaft, scraper cams having a height of 4 mm which acted to maintain the annular gaps free of crystals. Water which was thermostatically controlled at 40° C. was flowed through the jacket of the uppermost chamber, while ice water was passed through the jacket of the lowermost (i.e., the sixth) chamber. There was passed ordinary cooling water (average temperature about 15° C.) into the inlet of the jacket of the fifth chamber in countercurrent through the cooling jackets of the fifth, fourth, third and second chambers and exiting the cooling jacket of the second chamber at a temperature of about 30° C.

By means of a rotary slide valve piston dosing pump, there were removed from the bottom of the sixth chamber about 40 liters per hour of a crystalline slurry which was fed directly to a thrust centrifuge.

When a purified fructose such as is obtained, for example, according to the process of U.S. Pat. application Ser. No.

569,326 was used as starting material, an after washing of the recovered crystalline product with cold methanol can be omitted.

The first crystallizate obtained still contained about 3 percent methanol and was, therefore, dried under vacuum. The yield of the first crystallizate amounted to 22.1 kg. per hour, corresponding to 83 percent of theory. The mother liquor still contained 1.1 kg. sieve undersize per hour, which corresponded to 4.1 percent of theory. The methanol was substantially completely recovered from the mother liquor and returned to the process. From the syrupy residue, there could be isolated a second, impure fraction of fructose which was advantageously returned to the purification step in the production of the fructose thick syrup. The sieve analysis of the first crystallizate had the following results:

| Particle Size | Proportion |
| --- | --- |
| >1.00 mm. | 0.8% |
| >0.40 mm. | 6.4% |
| 0.40–0.10 mm. | 71.3% |
| 0.10–0.06 mm. | 21.5% |

We claim:
1. Process for recovering crystalline fructose from methanolic solutions thereof, comprising dissolving molten fructose having a temperature of 60° to 75° C. and a water content of less than 3 percent under intensive stirring in substantially the same volume of preheated methanol to give a solution having a fructose concentration of 55–70 percent and a temperature of 40°–50° C., continuously introducing the thusly formed solution into the top end of a vertically arranged, closed, seed crystal-containing crystallization zone, said crystallization zone being horizontally subdivided into a plurality of subzones each adapted at a different temperature, passing said solution downwardly through said crystallization subzones while maintaining said subzones at temperatures decreasing in the downward direction of flow of said solution, removing crystalline slurry from the lowermost of said subzones in an amount corresponding substantially to the amount of fructose and methanol introduced into the upper end of said crystallization zone and thereafter separating crystalline fructose from said slurry.

2. Process according to claim 1 wherein said molten fructose has a water content of less than 2 percent.

3. Process according to claim 1 wherein said molten fructose is mixed with said preheated methanol in an amount to give a solution having a solution having a fructose concentration of 60–65 percent.

4. Process according to claim 1 which comprises maintaining the first of said subdivided zones in the direction of flow at its temperature by externally contacting the same with water having a temperature of 40° C., maintaining the last of said subdivided zones at its temperature by externally contacting said zone with ice water and maintaining the subdivided zones intermediate said first and last subdivided zones at their temperatures by externally contacting them with water passed in countercurrent to the flow of said solution, the water having an initial temperature of about 15° C.

5. Process according to claim 1 wherein said crystalline fructose is separated from the slurry containing the same by centrifugation.

6. Process according to claim 1 wherein said crystallization zone is subdivided into six zones.

7. Apparatus for recovering crystalline fructose from methanolic solutions thereof comprising:
   a. vertically arranged cylindrical mixing vessel, stirrer means disposed therein, two separate inlet means including dosing pump means provided at the lower end thereof for introducing methanol and molten fructose and discharge means at the upper end thereof for discharging methanolic fructose solution therefrom;
   b. a jacketed, vertically arranged, closed, seed crystal containing, cylindrical crystallization vessel, inlet means provided at the upper end thereof connected with the outlet means provided in said mixing vessel, a stirrer shaft disposed in said crystallization vessel passing downwardly through the crystallization vessel, a plurality of intermediate dividers each having a central bore therein through which said stirrer shaft extends, said intermediate dividers dividing said vessel and its jacket into separate chambers, the temperatures of each which can be varied with respect to the others, annular gaps provided between said central bores and said stirrer shaft and discharge means provided at the lower end of said crystallization vessel; and
   c. dosing pump means connected to said crystallization vessel discharge means correlated to act with said dosing pump means provided in said mixing vessel.

8. Apparatus according to claim 7 wherein said stirrer shaft is provided with scraper cams at the level of said annular gaps.

9. Apparatus according to claim 7 wherein the first chamber of said crystallization vessel is provided with a pressure equilibrating tube.

10. Apparatus according to claim 7 wherein said dosing pump means are automatically regulated by the level to which the crystallization vessel is filled with solution.

11. Apparatus according to claim 7 wherein said dosing pumps are automatically regulated by the internal pressure in said crystallization vessel.

12. Apparatus according to claim 7 wherein said stirrer shaft is provided with stirrer arms.

13. Apparatus according to claim 12 wherein said stirrer arms are in the form of closed stirrups.